R. J. Gould.
Packing for Hose Coupling.
Nº 75151. Patented Mar. 3, 1868.
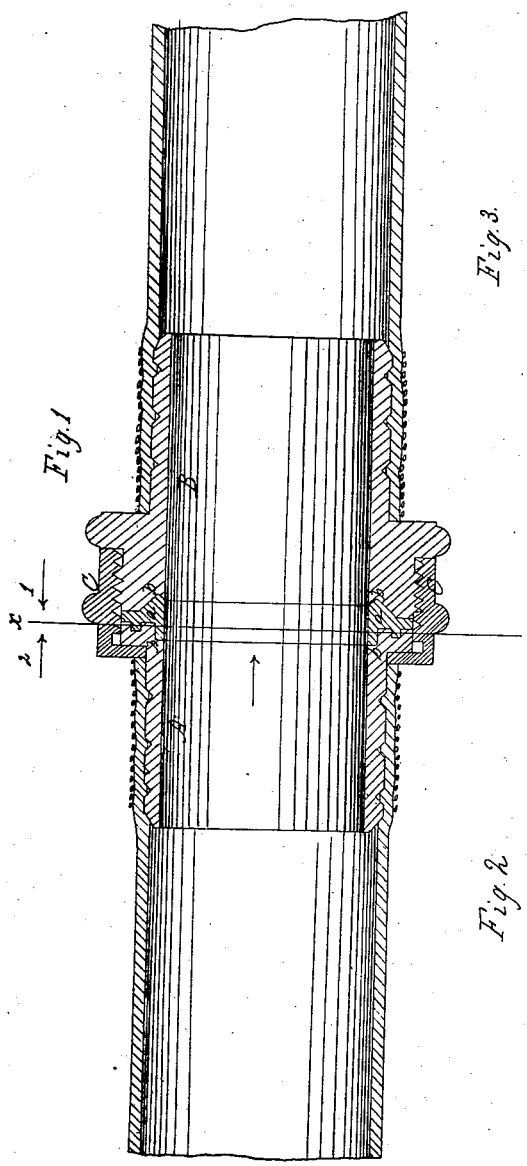
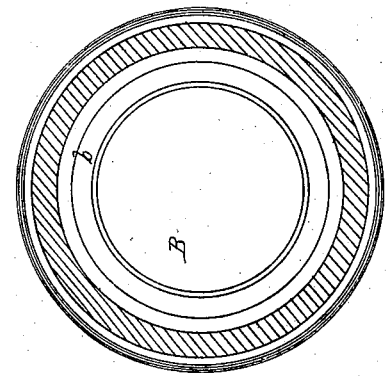
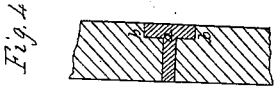
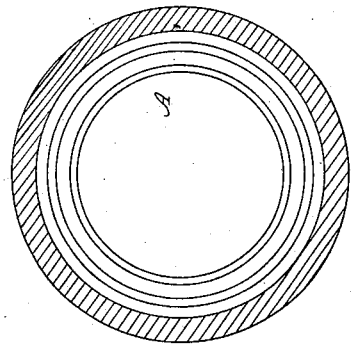
Witnesses
Gustav Berg
N. H. Dryburgh
Inventor
R. J. Gould
per
Nav. Eastwood & Haaf
Attys

United States Patent Office.

R. J. GOULD, OF NEW YORK, N. Y.

Letters Patent No. 75,151, dated March 3, 1868.

---

IMPROVED PACKING FOR HOSE-COUPLINGS.

---

*The Schedule referred to in these Letters Patent and making part of the same.*

---

TO ALL WHOM IT MAY CONCERN:

Be it known that I, R. J. GOULD, of New York, 102 Liberty street, in the county and State of New York, did invent a new and useful Improvement in Packing for Hose-Coupling, and other articles; and I do hereby declare that the following is a full, clear, and exact description thereof, which will enable those skilled in the art to make and use the same, reference being had to the accompanying drawing, forming part of this specification, in which drawing—

Figure 1 represents a longitudinal central section of this invention.

Figure 2 is a transverse section thereof, the plane of section being indicated by the line $x\ x$, fig. 1, and looking in the direction of arrow 1, marked opposite to that line.

Figure 3 is a similar section, taken in the plane indicated by the line $x\ x$, fig. 1, and looking in the direction of arrow 2.

Figure 4 is a modification of my packing-piece.

Similar letter indicate corresponding parts.

This invention relates to a packing for a hose-coupling or other article, which consists of a T-shaped strip or ring, of India rubber or other suitable soft and flexible material, the ends of the cross-bar of which are flat or V-shaped, and which is secured between the surfaces to be joined, said surfaces being provided with square or V-shaped recesses to correspond to the ends of the cross-bar of the packing in such a manner that when the surfaces to be joined are brought together, the ends of the cross-bar of the packing are compressed by the recesses, and a perfectly tight joint is produced.

I will now proceed to describe my invention in its application to a hose-coupling, but it is obvious that the same packing may be used for a great many different purposes.

A represents the first, and B the second half coupling, which may be constructed in the form of an ordinary union joint, as shown in the drawing, to be held together by a nut, C, or which may be united in any other desirable manner. The joint between the ends of the two half couplings is rendered tight by a packing-ring, $a$, which I make by preference of India rubber, but which might be made of leather or other suitable material. This packing-ring is T-shaped, and it may be firmly secured at one end to the first half coupling A. If made of India rubber, it may be attached to said half coupling by vulcanizing it in the required position, or it may be fastened in any other suitable manner, and if desired, the edge of the half coupling A may be made V-shaped instead of making it in the form shown in the drawing. One end of the cross-bar of the packing-ring $a$ is made V-shaped, and a corresponding V-shaped groove, $b$, is turned or otherwise produced in the edge of the second half coupling B, as clearly shown in figs. 1 and 3 of the drawing. When the two half couplings are brought together, the groove $b$ overlaps the loose end of the packing-ring, and at the same time, by the shape of said groove, the packing is firmly crowded into the joint, and a perfectly tight joint is the result, which is not liable to become leaky, whatever the direction of the current of water passing through the coupling may be. If said current moves in the direction of the arrow marked in the interior of the coupling in fig. 1, it meets the end of the packing-ring, which is firmly attached to the half coupling A, and if the current moves in the opposite direction of said arrow, it meets the edge of the packing-ring, which is embedded in the V-shaped groove $b$, and consequently said packing-ring is not liable to tip over, in whatever direction the current moves, and the joint remains tight under all circumstances; and furthermore, if the joint is exposed to an internal pressure, it will be rendered tight by the pressure itself, even if the two half couplings should not be screwed up perfectly tight.

What I claim as new, and desire to secure by Letters Patent, is—

The arrangement of a T-shaped packing-piece, $a$, having the ends of the cross-bar flat or V-shaped, in combination with correspondingly-shaped recesses $b$ in the surfaces to be joined, said packing overlapping the inner surfaces of both parts A and B of the coupling, substantially as and for the purposes set forth.

R. J. GOULD.

Witnesses:
W. HAUFF,
G. BERG.